United States Patent
Kollmann et al.

(10) Patent No.: US 12,010,978 B1
(45) Date of Patent: Jun. 18, 2024

(54) SMART LIVEWELL SYSTEM

(71) Applicant: Brunswick Corporation, Mettawa, IL (US)

(72) Inventors: Troy J Kollmann, New Smyrna Beach, FL (US); Cody Sullivan, Champaign, IL (US); Andrew Peoples, Dundonald (IE); Simon H. McFarland, Comber (IE); Steven J Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 109 days.

(21) Appl. No.: 17/666,884

(22) Filed: Feb. 8, 2022

(51) Int. Cl.
*A01K 63/04* (2006.01)
*A01K 63/02* (2006.01)

(52) U.S. Cl.
CPC ............ *A01K 63/047* (2013.01); *A01K 63/02* (2013.01)

(58) Field of Classification Search
CPC ...... A01K 63/02; A01K 63/047; A01K 63/00; A01K 63/04; A01K 63/042; A01K 97/05
USPC ........................................................ 119/203
See application file for complete search history.

(56) References Cited

U.S. PATENT DOCUMENTS

| | | | | |
|---|---|---|---|---|
| 4,129,095 A | * | 12/1978 | Roberts | A01K 63/02 119/201 |
| 4,631,851 A | * | 12/1986 | Whitehurst | G01G 19/60 43/7 |
| 4,718,507 A | * | 1/1988 | Howlett | G01G 23/01 177/229 |
| 4,748,765 A | * | 6/1988 | Martin | A01K 97/05 43/55 |
| 4,839,675 A | * | 6/1989 | Owen | A01K 97/00 206/315.11 |
| 4,936,399 A | * | 6/1990 | Christman | G01G 19/18 177/148 |
| 4,945,672 A | * | 8/1990 | Raia | A01K 97/05 43/57 |
| 4,966,096 A | | 10/1990 | Adey | |
| 5,156,111 A | * | 10/1992 | Heggelund | A01K 63/02 119/218 |

(Continued)

FOREIGN PATENT DOCUMENTS

CN 101814228 A 8/2010

OTHER PUBLICATIONS

People et al., "Livewell System", U.S. Appl. No. 17/666,756, filed Feb. 8, 2022 (drawings and specification, including the claims, only).

(Continued)

*Primary Examiner* — Timothy D Collins
*Assistant Examiner* — Maria E Graber
(74) *Attorney, Agent, or Firm* — Andrus Intellectual Property Law, LLP (57) ABSTRACT

A livewell system comprises a tank for holding water and aquatic life. A scale measures a weight of the tank and any contents of the tank. At least one sensor determines a property of the water in the tank. A pump pumps water into the tank. A controller is provided in signal communication with the scale, the at least one sensor, and the pump. The controller controls the pump based on information from the scale and the at least one sensor. A kit for a livewell system on a marine vessel, including a scale and a measurement module in signal communication with a controller, is also provided.

20 Claims, 5 Drawing Sheets

(56) References Cited

U.S. PATENT DOCUMENTS

| | | | |
|---|---|---|---|
| 5,545,855 A | 8/1996 | Stanfield et al. | |
| 5,637,838 A | 6/1997 | Arey et al. | |
| 5,732,654 A * | 3/1998 | Perez | A01K 61/00 |
| | | | 119/204 |
| 5,854,447 A * | 12/1998 | Greenwood | G01G 19/60 |
| | | | 177/25.14 |
| 6,222,449 B1 | 4/2001 | Twining | |
| 6,273,771 B1 | 8/2001 | Buckley et al. | |
| 6,290,908 B1 | 9/2001 | Fukunaga et al. | |
| 6,447,681 B1 | 9/2002 | Carlberg et al. | |
| 6,557,492 B1 * | 5/2003 | Robohm | A01K 63/02 |
| | | | 119/261 |
| 6,717,383 B1 * | 4/2004 | Brunt | A01K 63/047 |
| | | | 239/18 |
| 6,765,155 B1 | 7/2004 | Gray | |
| 6,962,019 B1 | 11/2005 | McDougle | |
| 7,156,617 B2 | 1/2007 | Rossman | |
| 7,162,831 B1 * | 1/2007 | Morton | A01K 63/045 |
| | | | 119/261 |
| 7,605,332 B2 * | 10/2009 | Winkler | A01K 97/08 |
| | | | 340/573.2 |
| 8,505,489 B2 * | 8/2013 | Lyngstad | A01K 63/02 |
| | | | 119/201 |
| 8,883,079 B2 | 11/2014 | Clark | |
| 8,996,210 B2 | 3/2015 | Kish et al. | |
| 9,693,537 B2 * | 7/2017 | Stiles, Jr. | B01F 25/53 |
| 9,876,692 B2 | 1/2018 | Lai et al. | |
| 10,163,199 B2 * | 12/2018 | Gilmore | G06T 7/0002 |
| 10,200,823 B2 * | 2/2019 | Laster | H04W 4/40 |
| 10,251,382 B2 * | 4/2019 | Bailey | G06F 11/3476 |
| 10,599,922 B2 * | 3/2020 | James | G06T 7/62 |
| 10,990,622 B2 * | 4/2021 | Laster | A01K 97/00 |
| 11,475,689 B2 * | 10/2022 | Young | G06T 7/70 |
| 2003/0116489 A1 | 6/2003 | Terato | |
| 2004/0118359 A1 | 6/2004 | Badell | |
| 2004/0249860 A1 | 12/2004 | Stechschulte et al. | |
| 2006/0265940 A1 | 11/2006 | McAller, Jr. et al. | |
| 2007/0068063 A1 * | 3/2007 | Simpson | A01K 97/20 |
| | | | 43/57 |
| 2008/0028667 A1 | 2/2008 | Grzybowski | |
| 2009/0120853 A1 * | 5/2009 | Vento | A01K 63/02 |
| | | | 210/167.26 |
| 2011/0208479 A1 | 8/2011 | Chaves | |
| 2011/0308938 A1 * | 12/2011 | Gilmore | C02F 1/463 |
| | | | 204/230.2 |
| 2012/0085019 A1 * | 4/2012 | Link | A01K 97/01 |
| | | | 43/55 |
| 2015/0289093 A1 | 10/2015 | Petty et al. | |
| 2017/0215401 A1 | 8/2017 | Ellis, II | |
| 2017/0303516 A1 * | 10/2017 | Baker | A01K 63/065 |
| 2017/0325427 A1 * | 11/2017 | Straight | A01K 63/065 |
| 2018/0365246 A1 | 12/2018 | Laster et al. | |
| 2021/0284293 A1 | 9/2021 | Garringer et al. | |
| 2022/0256818 A1 * | 8/2022 | Takehiro | A01K 63/06 |

OTHER PUBLICATIONS

Kollmann et al., "Livewell System And Method", U.S. Appl. No. 17/666,761, filed Feb. 8, 2022 (drawings and specification, including the claims, only).

Kollmann et al., "Oxygenation Of Water In A Livewell System", U.S. Appl. No. 17/667,120, filed Feb. 8, 2022 (drawings and specification, including the claims, only).

ANGLR, "Features for anglers, made by anglers like you," website, admitted prior art, available at https://www.anglr.com/features, last accessed Nov. 8, 2021.

Fondriest Environmental, Inc., "Dissolved Oxygen," Fundamentals of Environmental Measurements, Nov. 19, 2013, https://www.fondriest.com/environmental-measurements/parameters/water-quality/dissolved-oxygen/, last accessed Nov. 8, 2021.

Hill, Patrick, "6 Tips to Remove Ammonia from Wastewater Lagoons," Sep. 9, 2013, web article, available at http://www.triplepointwater.com/remove-ammonia-from-wastewater-lagoons/#.XmkIQEBFyUk, last accessed Nov. 8, 2021.

Al-Hafedh et al., "Performance of plastic biofilter media with different configuration in a water recirculation system for the culture of Nile tilapia (Oreochromis niloticus)," Jun. 4, 2003, Aquacultural Engineering 29, pp. 139-154.

Libelium Comunicaciones Distribuidas S.L., "Open Aquarium—Aquaponics and Fish Tank Monitoring for Arduino," at least as early as Aug. 7, 2014, web article, available at https://www.cooking-hacks.com/documentation/tutorials/open-aquarium-aquaponics-fish-tank-monitoring-arduino.html, last accessed Nov. 11, 2021.

\* cited by examiner

SMART LIVEWELL SYSTEM

FIELD

The present disclosure relates to systems for maintaining aquatic life in a tank installed on a marine vessel.

BACKGROUND

U.S. Pat. No. 6,222,449 discloses a portable recording device, namely a remote logging unit, for electronically recording relevant information related to fishing conditions, and the like. The recording device has sensors for detecting environmental conditions and/or for measuring physical data on a specimen caught. The device also includes input mechanisms, such as a touch screen, for manually entering information, and a display for reviewing information stored in the device's memory. The recording device may be connectable to a personal computer for creating a personal log of the user's activities and/or for loading additional information into the device. The device may transfer recorded data to a central repository, for example using a transmitter/receiver for sending a data signal to a network server which maintains a database of information related to fishing conditions at a number of locations. The network server may receive and compile information from a number of remote units at various locations, thereby providing a system for sharing such information. A remote unit may contact the server from a remote location and request information on fishing conditions for a selected location.

U.S. Pat. No. 6,273,771, which is hereby incorporated by reference herein, discloses a control system for a marine vessel incorporating a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,962,019 discloses an enhanced filtration and water conditioning system for a novel bait tank suitable for use in recreational boats, dockside and land based personal and commercial applications wherein water from the tank may be climactically controlled, filtered, purged of sediment, displaced scales and other fish waste and returned to the live well tank. Separate first and second water compartments within the tank function in concert with a second interior wall and a second interior bottom, a dual compartment filtration unit removably accommodated within the interior portion of the second compartment, and filtration unit inflow and outflow water conduits with each of the conduits communicably attaching the filtration unit to the first and said second interior water compartments. An independent circulatory means allows for water to be additionally withdrawn from the tank and introduced to a refrigerant based heat exchanger means, regulated in a manner to sustain a water temperature necessary to sustain the life of fish placed within the tank and then re-introduced into the tank.

U.S. Pat. No. 8,883,079 discloses a water-quality monitoring system for an aquatic environment that includes a monitoring unit and a chemical indicator wheel designed and configured to be submerged in the water being monitored. The chemical indicator wheel includes a holder that supports a number of chemical indicators selected for use in measuring levels of constituents of the water. When in use, the wheel is drivingly engaged with a monitoring/measuring unit that includes at least one reader for reading the chemical indicators. In some embodiments, each apparatus includes a plurality of immobilized-dye-based chemical indicators that undergo an optically detectable physical change as levels of one or more constituents of the water change. Also disclosed are a variety of features that can be used to provide the monitoring system with additional functionalities.

U.S. Patent Application Publication No. 2004/0249860 discloses a system for collecting, storing, processing and transmitting fishing or other sport information including a data logging and processing module and connected sensors for automatically collecting data during participation in the sport. A data communication module collects data input by the user. Data from both modules is input into a personal computer connected to a web site that uses the data from the modules and collected related data to provide a virtual guide service.

U.S. Patent Application Publication No. 2011/0208479 discloses a data receiving and storage device designed to record and display any and all relevant data that might be useful to an angler. A portable platform containing a fish scale, fish measuring apparatus, and a display with a user interface allows an angler to record data on each fish that is caught, including GPS position where the fish was caught and what time of day. The device is capable of storing data for numerous fish and culling fish so that the angler knows to remove smaller fish when the device has determined that the most recently caught fish is larger than one stored in the boat's fish locker.

U.S. Patent Application Publication No. 2017/0215401 discloses a live well oxygen and temperature level alert and control apparatus including a temperature sensor and oxygen sensor con figured to sense the temperature and oxygen level of a live well. The sensed signal is sent to a controlling and monitoring apparatus. The controlling and monitoring apparatus is linked to a heating or cooling control system of the live well. Further, the alert apparatus may be configured to control the supply of the fresh or salt replacement water to the live well by controlling a valve supplying such water. The controlling and monitoring apparatus is configured to alert a user about the oxygen and temperature level of the water inside the live-well and control these levels via a user interface. The further inventive aspects can be embodied in one or more of a display screen, a speaker, and an alarm for communicating oxygen and temperature level to a user.

U.S. Patent Application Publication No. 2018/0365246, which is hereby incorporated by reference herein, discloses livewells of a vessel that are used to store caught fish, such as during fishing competitions. Example apparatuses, systems, and methods are provided that may track and use fishing information for efficient operation and control of livewells and the associated pumps. An example marine electronic device of a vessel comprises a user interface with a display screen, a processor, and memory including computer program code. The memory and the computer program code are configured to, with the processor, cause the marine electronic device to receive an indication of a fish catch and cause, in response to receiving the indication of the fish catch, a pump associated with a livewell of the vessel to one of fill the livewell with water or recirculate water in the livewell, wherein the water is pumped from a body of water in which the vessel is at least partially submerged.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a livewell system comprises a tank configured to hold water and aquatic life. A scale is configured to measure a weight of the tank and any contents of the tank. At least one sensor is configured to determine a property of the water in the tank. A pump is configured to pump water into the tank. A controller is provided in signal communication with the scale, the at least one sensor, and the pump. The controller is configured to control the pump based on information from the scale and the at least one sensor.

According to one example, the livewell system further comprises an ammonia filter in-line with the pump. The at least one sensor comprises an ammonia sensor, and the property of the water in the tank is an ammonia content of the water in the tank. The controller is configured to control the pump to pump water out of the tank, through the ammonia filter, and back into the tank in response to determining that the ammonia content of the water exceeds a predetermined ammonia content threshold.

According to one example, the livewell system further comprises a housing in which the at least one sensor is located, wherein an interior of the housing is in fluid communication with an interior of the tank.

According to one example, the livewell system further comprises a transmitter in signal communication with the controller, wherein the transmitter is configured to transmit information related to the property of the water in the tank from the controller to a portable electronic device.

According to one example, the livewell system further comprises a global positioning system receiver in signal communication with the controller. The controller is configured to store a geographical position of a marine vessel on which the livewell system is installed in connection with information related to at least one of the following: aquatic life added to the tank at the geographical location, a dissolved oxygen content of water in which the marine vessel is operating at the geographical location, and a temperature of water in which the marine vessel is operating at the geographical location.

According to another example of the present disclosure, a kit for a livewell system comprises a scale configured to measure a weight of a tank of the livewell system and any contents of the tank. The kit also comprises a measurement module comprising a housing having an interior in fluid communication with an interior of the tank and configured to receive water from the tank, at least one sensor located at least partially within the interior of the housing and configured to determine a property of the water in the tank that is received in the housing, and a controller in signal communication with the scale and the at least one sensor. The controller is configured to control a pump that pumps water into the tank based on information from the scale and the at least one sensor.

According to one example, the kit further comprises an ammonia filter in the housing. The measurement module is configured to be installed in-line with the pump. The at least one sensor comprises an ammonia sensor, and the property of the water in the tank is an ammonia content of the water in the tank. The controller is configured to control the pump to pump water out of the tank, through the ammonia filter, and back into the tank in response to determining that the ammonia content of the water exceeds a predetermined ammonia content threshold.

In one example of the kit, the measurement module further comprises a transmitter in signal communication with the controller, and the transmitter is configured to transmit information related to the property of the water in the tank from the controller to a portable electronic device.

In one example of the kit, the controller is configured for signal communication with a global positioning system receiver. The controller is configured to store a geographical position of a marine vessel on which the kit is installed in connection with information related to at least one of the following: aquatic life added to the tank at the geographical location, a dissolved oxygen content of water in which the marine vessel is operating at the geographical location, and a temperature of water in which the marine vessel is operating at the geographical location.

In one example of the kit, the measurement module is configured to be installed in-line with a water recirculation system of the livewell system.

According to some examples, the livewell system or kit further includes an additional sensor configured to provide information to the controller related to a volume of water displaced upon addition of aquatic life to the tank, and the controller is configured to determine the volume of water displaced based on the information from the additional sensor. The controller is configured to determine a weight of the aquatic life added to the tank based on information from the scale and the volume of water displaced. The controller is configured to control the pump based on the weight of the aquatic life added to the tank.

According to some examples of the livewell system or kit, the controller is configured to control the pump based on a species of the aquatic life added to the tank.

According to some examples of the livewell system or kit, the at least one sensor comprises a first sensor sensing a dissolved oxygen content of the water in the tank and a second sensor sensing a temperature of the water in the tank. The controller is configured to control the pump so as to maintain the dissolved oxygen content of the water within a predetermined dissolved oxygen content range and so as to maintain the temperature of the water within a predetermined temperature range.

BRIEF DESCRIPTION OF THE DRAWINGS

Examples of livewell systems and kits therefor are described with reference to the following Figures. The same numbers are used throughout the Figures to reference like features and like components.

DETAILED DESCRIPTION

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

As used here, the term "livewell" is broader than its typical use, and encompasses any holding tanks, livewells, baitwells, or fish tanks, whether boat-mounted or not, configured to contain water for supporting aquatic life. For example, livewells are used to hold fish or other aquatic animals that are intended to be transferred back to the water from which they were caught or into another tank.

Figure 1:
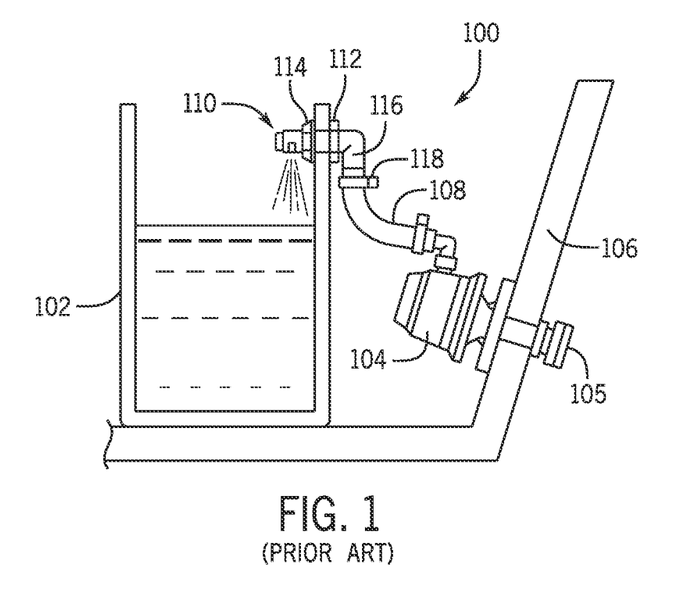
FIG. 1 illustrates one example of a prior art livewell system installed on a marine vessel.

Typically, a livewell system is installed on a marine vessel in one of two ways. Referring to FIG. 1, the livewell system 100 shown therein includes a tank 102 configured to hold water, which is provided to the tank 102 by a pump 104 that extends through the hull 106 of the marine vessel and into the body of water in which the marine vessel is operating. The pump 104, which includes a strainer on or near its inlet 105, draws water from the body of water in which the marine vessel is operating and pumps it through a hose 108 to an aerator spray head 110, which sprays the water into the tank 102. The aerator spray head 110 includes a fitting extending through the wall of the tank 102, which is held in place by a flange 112 and an adjustable nut 114. The hose 108 is held to a hose barb 116 at the end of the fitting by way of a hose clamp 118.

Figure 2:
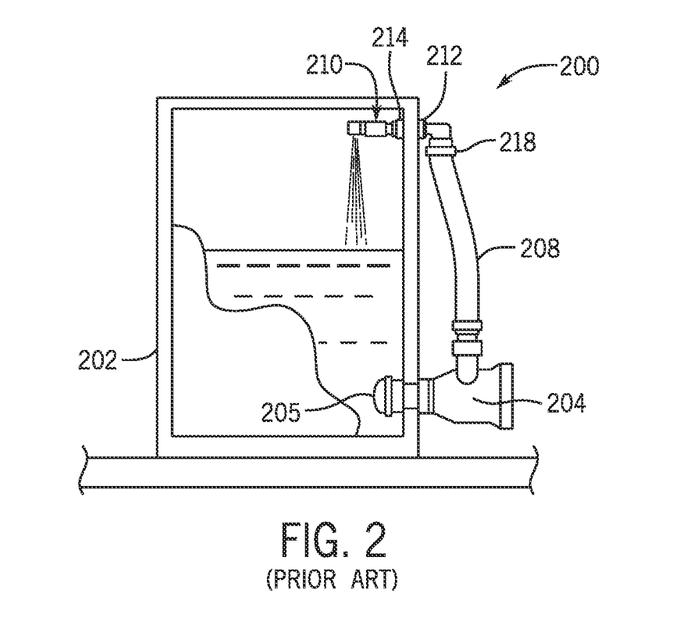
FIG. 2 illustrates another example of a prior art livewell system installed on a marine vessel.

In another prior art livewell system 200, as shown in FIG. 2, instead of being drawn from the body of water in which the marine vessel is operating, water is drawn into the pump 204 via a pump inlet 205 situated in the tank 202. Recirculated water is pumped through the hose 208 and back into the tank 202 via aerator spray head 210. Other components not specifically described with respect to FIG. 2 are similar to those with like numbering described hereinabove with respect to FIG. 1.

In some systems, both a freshwater pump (FIG. 1) and a recirculation pump (FIG. 2) are provided. In some systems, only one pump is provided, and internal or external valving draws water from the body of water or the tank as desired. In any of the above or below examples, one non-limiting example of a suitable pump may be found in U.S. Pat. No. 7,156,617, which is hereby incorporated by reference herein in its entirety. Commercially available non-limiting examples of a pump of this type are the Tsunami Aerator Pumps T500, T800, or T1200, available from Attwood Corporation of Lowell, Michigan. In general, however, any livewell aerator pump would be suitable for the present applications.

Through research and development, the present inventors have realized that it would be beneficial to be able to monitor the conditions in a livewell, such as, but not limited to, dissolved oxygen ("DO") levels, ammonia levels, pH, and temperature, and to report these conditions to a user who is remote from the livewell. So too would it be beneficial to automatically run one or more pumps associated with the livewell in order to bring one or more of the above conditions back within a desired range. The present inventors also realized that some of the above conditions vary with fish species and/or weight, and therefore developed a system and algorithm that are able to account for such variability during automatic control of the livewell pump(s). Although the below systems are shown and described with respect to a recirculation pump as show in FIG. 2, it should be understood that a pump that pumps water into the livewell from an external body of water could additionally or alternatively be used in the below systems and algorithms.

Figure 3:
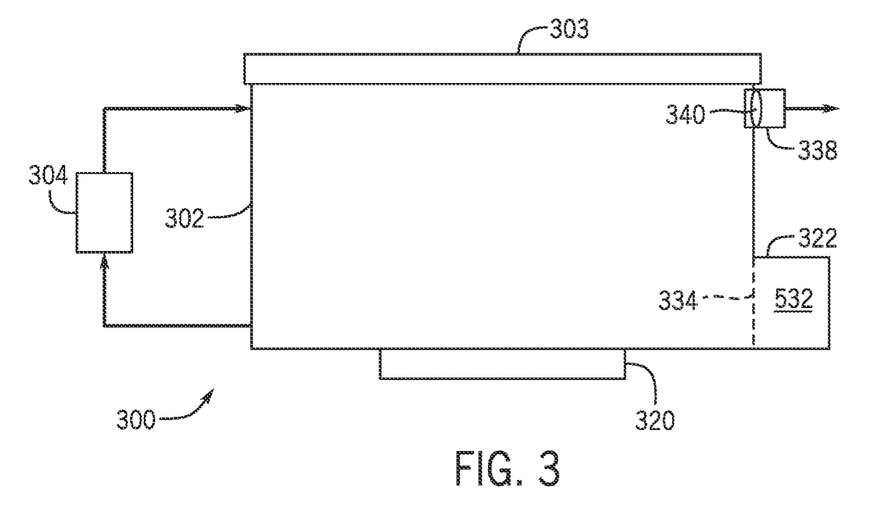
FIG. 3 illustrates one example of a smart livewell system according to the present disclosure, with a measurement module in direct fluid communication with the tank.
Figure 5:
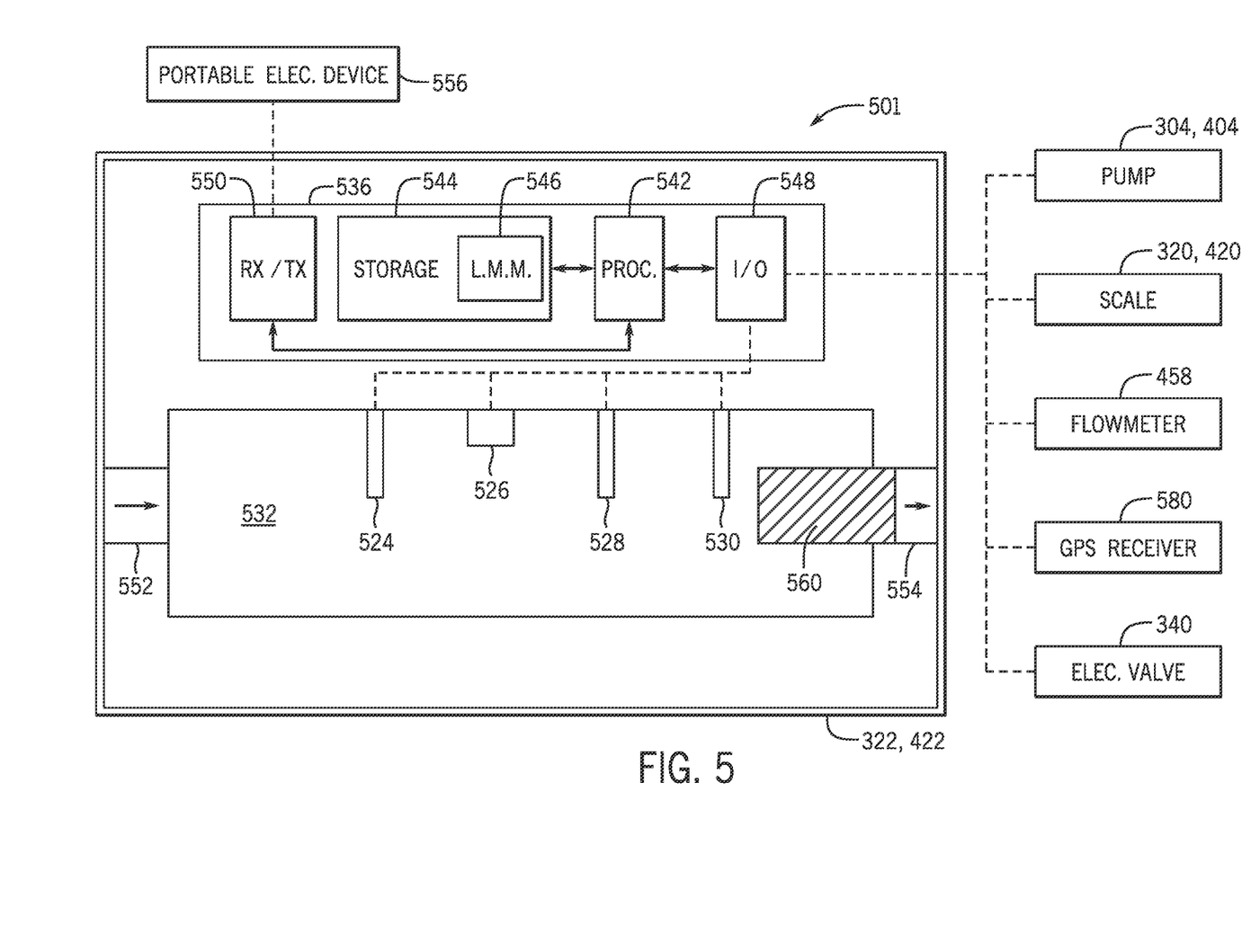
FIG. 5 illustrates an example of a measurement module.

Referring to FIG. 3, according to one example of the present disclosure, a livewell system 300 comprises a tank 302 configured to hold water and aquatic life. The livewell system 300 is described herein as being installed on a marine vessel, but it could be installed in another mobile or immobile location. At least one scale 320 is configured to measure a weight of the tank 302 and any contents of the tank 302 (e.g., water, aquatic life). The scale 320 could be a single digital scale located under and supporting the tank 302. Alternatively, a combination of two, three, four or more digital scales located under and supporting the tank 302 or suspending the tank 302 therefrom could be provided, it being understood that a combined reading from each scale would provide the total weight of the tank 302 and any contents of the tank 302. Referring to FIG. 5 as well, at least one sensor (524, 526, 528, 530) is configured to determine a property of the water in the tank 302. The livewell system 300 includes a housing 322 in which the at least one sensor 524, 526, 528, 530 is located, and an interior 532 of the housing 322 is in fluid communication with an interior of the tank 302. In the present example, the housing 322 is attached directly to the outside wall of the tank 302, and such fluid communication between the interior 532 of the housing 322 and the interior of the tank 302 is provided by way of a hole in the wall covered by a screen, grate, or the like between the housing 322 and the tank 302, as shown at 334. Water, but not aquatic life, can flow freely between the tank 302 and the interior 532 of the housing through the screen or grate 334. The housing 322 could alternatively be provided as part of or connected to the lid 303 over the tank 302.

A pump 304 is configured to pump water into the tank 302, here, by recirculating water from the tank 302 as shown by the arrows. The water may re-enter the tank 302 through an aerator spray head (not shown) to increase the DO content in the tank 302, as shown and described hereinabove. A controller 536 is provided in signal communication with the scale 320, the at least one sensor 524, 526, 528, 530, and the pump 304. The controller 536 is configured to control the pump 304 based on information from the scale 320 and the at least one sensor 524, 526, 528, 530, as will be described further herein below.

Still referring to FIG. 5, the controller 536 includes a processing system 542 and a storage system 544 accessible by the processing system 542. The controller 536 includes a livewell monitoring module ("LMM") 546, which is a set of software instructions executable to monitor properties of the water in the tank 302, determine if action needs to be taken to change those properties, and execute a routine to bring the properties back within a predetermined range, as described herein below. The controller 536 also includes an input/output (I/O) interface 548, which relays information to and from the processing system 542. Note that the controller 536 is not shown as being connected to every component in the diagrams provided herein, but the controller 536 is in fact directly or indirectly electrically and/or signally connected to each component that it is described as controlling or from which it receives information.

The housing 322 is part of a measurement module 501, and as noted, has an interior 532 in fluid communication with the interior of the tank 302 and configured to receive water from the tank 302. For example, water can flow into the interior 532 of the housing 322 via an inlet 552 (such as a conduit or passageway) and out of the interior 532 of the housing 322 via an outlet 554 (also a conduit or passageway). The at least one sensor 524, 526, 528, 530 is located at least partially within the interior 532 of the housing 322 and is configured to determine a property of the water in the tank 302 that is received in the housing 322. For example, the probe end of the at least one sensor 524, 526, 528, 530 is located such that it can come into contact with water in the interior 532 of the housing 322, while the body end thereof is located in a wall (such as the interior wall as shown here) of the housing 322. The at least one sensor 524, 526, 528, 530 is electrically connected to the I/O interface 548. Although a serial connection is shown here for the sake of clarity, separate direct connections could instead be made.

The sensor 524 can be a dissolved oxygen content sensor, such as a galvanic DO sensor, as is known. The DO sensor 524 is configured to provide information to the controller 536 related to how much dissolved oxygen there is in the water (e.g., in mg/L). The sensor 526 can be an ammonia sensor, which may be any electrode-type sensor that can directly measure the ammonia concentration in the water or an optical sensor. The sensor 528 can be a pH sensor, which may be an electrode-type sensor that can directly measure the pH of the water. The sensor 530 can be a temperature sensor, which may be any type of known water temperature sensor, such as a thermistor, a thermocouple, or an infrared sensor. One or more of the sensors 524, 526, 528, 530 may be combined into a single unit. Other sensors such as a turbidity sensor, a pressure sensor, and a conductivity sensor can also be provided.

The livewell system 300 further comprises a transmitter in signal communication with the controller 536. In one particular example, the transmitter is a transceiver 550, as shown here. The transceiver 550 is capable of two-way wireless communication, such as by way of Bluetooth®, Bluetooth Low Energy (BLE), ANT, or ZigBee wireless protocols. The transmitter (transceiver 500) is configured to transmit information related to the property of the water in the tank 302, as measured by the at least one sensor 524, 526, 528, 530, from the controller 536 to a portable electronic device 556, which may be a laptop, tablet, phone, livewell-dedicated hand-held unit, etc. The transceiver 550 is also configured to receive inputs (e.g., commands, information) from the portable electronic device 556, as will be described below.

Referring back to FIG. 3, the livewell system 300 further includes an overflow outlet 338 with a shutoff valve 340 therein. The shutoff valve 340 may be a butterfly valve or other suitable type of electrically actuated valve that is configured to shut off flow from the overflow outlet 338. The controller 536 is connected to a power source (not shown), such as a dedicated battery or the marine vessel's house battery, and is configured to actuate the shutoff valve 340. In another example, the shutoff valve 340 is mechanically actuated. In either case, when the shutoff valve 340 is closed, water cannot leave the tank 302 via the overflow outlet 338. Thus, when a user adds aquatic life (such as a fish) to the tank 302, the tank 302 and its contents will increase in weight. This increase in weight (as determined by the scale 320) is equal to the weight of the added fish. Generally, the user will want to leave the shutoff valve 340 open, so that any excess water will leave the tank 302 in a controlled manner, as the overflow outlet 338 is typically connected to a hose that drains water to the bilge of the marine vessel or overboard. However, when the user specifically wants to determine the weight of the fish, the user may choose to close the shutoff valve 340.

The shutoff valve 340 can be closed in different ways. In one example, the user can manually close the shutoff valve 340 in anticipation of adding a fish to the tank 302. In another example, the user can push a button or flip a switch on the tank 302 or the lid 303 or at a separate control panel to electrically actuate the valve 340. In still another example, the user can select an option presented in an application running on the user's portable electronic device 556, which input command will be wirelessly relayed to the controller 536 via the transceiver 550, and in response to which the controller 536 is configured to electrically actuate the shutoff valve 340 via the I/O interface 548.

Before or after the shutoff valve 340 is closed, but before the user places the fish into the tank 302, the controller 536 is configured to receive from the scale 320 an initial weight of the tank 302 and its contents and to store that initial weight in the storage system 544. After the user adds the fish to the tank 302, the controller 536 is configured to calculate the difference between the subsequent weight and the initial weight according to the software instructions stored in the LMM 546. The controller 536 can do this automatically in response to the weight changing, or in response to closing of the shutoff valve 340, or in response to the user selecting a "weigh" option via an application on the portable electronic device 556. When recording both the initial weight and the subsequent weight, the controller 536 may use an average of several readings from the scale 320 taken over a predetermined period of time to account for variations in weight caused by movement of the marine vessel. The controller 536 can send the weight of the fish (subsequent weight—initial weight) to the portable electronic device 556, where a user can view the weight in the application running on such device.

Figure 4:
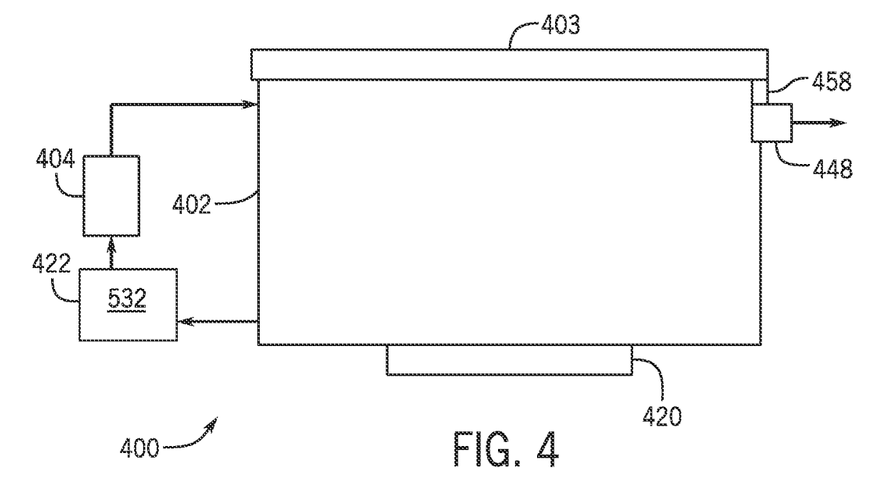
FIG. 4 illustrates another example of a smart livewell system according to the present disclosure, with a measurement module installed in-line with a recirculation system.

FIG. 4 shows another example of a livewell system 400. Two main differences between the livewell system 400 of FIG. 4 and the livewell system 300 of FIG. 3 are the location of the measurement module 501 and the way in which the controller 536 determines the weight of the fish added to the tank 402. Otherwise, the components are the same as those labeled with the same second and third digit. First, the measurement module 501 is located in a housing 422 that is not directly attached to the wall or lid 403 of the tank 402. Instead, a hose or other type of conduit is provided between an outlet from the tank 402 and the inlet 552 to the housing 422 in order to bring the interior 532 of the housing 422 into fluid communication with the interior of the tank 402. The housing 422 is located in-line with the pump 404, and its outlet 554 is connected to the inlet of the pump 404 via a hose or conduit. In other examples, the measurement module 501 could be provided downstream of the pump 404, between the pump 404 and the inlet into the tank 402. Alternatively, the measurement module 501 may be an integral part of the pump 404. Second, the livewell system 400 is not provided with a shutoff valve in the overflow outlet 448 (or if one is provided, it is not used in the same manner as noted hereinabove). Rather, a flowmeter 458 is provided in-line with the overflow outlet 448. The flowmeter 458 can be a volumetric flowmeter, which directly measures the volume of liquid passing through the flowmeter 458. Alternatively, the flowmeter 458 can be a velocity or mass flowmeter, from which the controller 536 can calculate the volume of water passing through the overflow outlet 448. In any case, the flowmeter 458 is a sensor configured to provide information to the controller 536 related to a volume of water displaced upon addition of aquatic life to the tank 402. When aquatic life (such as a fish) is added to the tank 402, the controller 536 is configured to determine the volume of water displaced based on the information from the flowmeter 458. The controller 536 is configured to determine a weight of the aquatic life added to the tank 402 based on information from the scale 420 and the volume of water displaced. The controller 536 can determine the weight of the aquatic life according to the equation $W_F = W_S - W_I + W_{DW}$, where $W_F$ is the weight of the fish, $W_S$ is the subsequent weight of the tank 402 and its contents after the fish is added, $W_I$ is the initial weight of the tank 402 and its contents before the fish is added, and $W_{DW}$ is the weight of the water displaced by the fish via the overflow outlet 448. The weight of the water displaced from the tank $W_{DW}$ can be determined from the volume of displaced water according to the equation $W_{DW} = \rho V g$, where $\rho$ is the density of water (known), V is the volume from the volumetric flowmeter 458 or as calculated from information from a mass or velocity flowmeter, and g is acceleration due to gravity. By way of one example, if addition of the fish does not cause the water to overflow from the tank 402, then $W_{DW} = 0$, and $W_F = W_S - W_I$.

It should be noted that although the method of measuring fish weight by closing a shutoff valve 340 is shown and described in connection with a measurement module 501 in which the housing 322 is shown as being attached to the wall of the tank 302 and directly in fluid communication therewith, the method of measuring fish weight by closing a shutoff valve 340 could instead be used with a system in which the housing 422 of the measurement module 501 is provided in-line with the recirculation pump 404, as shown in FIG. 4. Similarly, the method of measuring fish weight using a flowmeter 458 to determine the weight of displaced water could be used with a system in which the housing 322 of the measurement module 501 is directly connected to the wall of the tank 302, as shown in FIG. 3.

In still another example, the controller 536 is configured to estimate (as opposed to measure or calculate) the weight of the aquatic life added to the tank 402 based on the volume of water displaced upon addition of aquatic life to the tank 402. For example, the controller 536 may equate each gallon of water (or fraction thereof) displaced from the tank 402 to a pound (or fraction thereof) of fish.

Once the controller 536 determines the weight of the fish added to the tank 302, 402 by any of the methods described, the controller 536 can then control the pump 304, 404 based on the weight of the aquatic life added to the tank 302, 402. For instance, the controller 536 can turn on the pump 304, 404, such as by providing power to the pump 304, 404, to aerate the water in the tank 302, 402 for a period of time. For example, the controller 536 may have stored in its storage system 544 a look-up table correlating fish weight to a required DO content of the water. In another example, the controller 536 utilizes an equation stored in the storage system 544, equating fish weight to required DO content, instead of a look-up table, to determine the required DO content. The controller 536 can run the pump 304, 404 to aerate the water until the DO content, as determined by the DO sensor 524, reaches the required DO content from the look-up table or equation. In another example, the controller 536 is configured to learn by how much the DO content is increased each time the pump 304, 404 is run, and to correlate a pump run time to an increase in DO content. The controller 536 in that instance can be configured to determine the required DO content based on the addition of the fish, and run the pump 304, 404 for a period of time calculated to increase the DO content by the required amount.

In some examples of the livewell system 300, 400, the controller 536 is configured to control the pump 304, 404 based on a species of the aquatic life added to the tank 302, 402. For example, the user can input the species via the portable electronic device 556 by selecting a choice of species from a number of choices. In another example, the user can take a photograph of the fish and the controller 536 is configured to determine the species using pattern recognition software stored in the LMM 546. The controller 536 is configured to determine the required DO content based on the fish species, in addition to or regardless of weight, using a look-up table. In other examples, the user can pre-set a fish species for an entire fishing expedition, after which the controller 536 will know to use a subset of look-up tables or a particular equation relating weight to DO content for that particular species.

According to some examples of the livewell system 300, 400, not only is the controller 536 configured to control the pump 304, 404 so as to maintain the dissolved oxygen content of the water within a predetermined DO content range, the controller 536 is also configured to maintain the temperature of the water within a predetermined temperature range. The temperature range can be determined based on a temperature of the water in which the marine vessel is operating, as described more fully in Applicant's co-pending application Ser. No. 17/666,761, filed Feb. 8, 2022, which is hereby incorporated by reference herein. Alternatively, the desired temperature range can be set manually by the user via the portable electronic device 556. Alternatively, the predetermined temperature range can be determined based on fish species and/or weight, using look-up tables, with fish species and/or weight being determined as described hereinabove. The controller 536 can run the pump 304, 404 to bring the temperature back within range such as by running the pump to bring fresh water into the tank 302, 402 (if a pump is provided with a setup is similar to that of FIG. 1) or by running a recirculation pump capable of bypassing water to a heat exchanger. The controller 536 may be configured as described in Applicant's co-pending application Ser. No. 17/666,761 such that it may choose between using a pump that draws fresh water and a recirculation pump.

Information related to the weight of the fish added to the tank 302, 402 is useful not only for managing DO levels and/or temperature, but also for entertainment purposes. For instance, the controller 536 can be communicatively connected to the cloud by way of a telematics control module (not shown) including a cell chip that enables cellular communications with a central computing system in the cloud via a mobile broadband network (e.g., via 3G, 4G, or 5G broadband cellular network technology). The controller 536 can directly report the weight of the fish to the cloud-based central computing system, which can generate online reports in fishing tournaments for view by fishing enthusiasts. Alternatively, the controller 536 can report the fish weight to the user's portable electronic device 556 via the transceiver 550, and the user's portable electronic device 556 can report the fish weight to the cloud-based central computing system using its own cell chip.

Although it is possible that a telematics control unit could be provided for communicating almost all measurements over the internet, in general, most of the calculations will be run by the processing system 542 or a processor of the user's portable electronic device 556, as cell communication may not be available (or reliable) in all locations a user may desire to fish.

Returning to FIG. 5, the livewell system 300, 400 can further comprise an ammonia filter 560 in-line with the pump 304, 404. For example, the ammonia filter 560 can be provided at or just upstream of the outlet 554 of the measurement module 501 for easy access and so that the ammonia content measured by the ammonia sensor 526 is indicative of the ammonia content in the tank 302, 402 (rather that an ammonia content post-filter 560). In other examples, the ammonia filter 560 can be elsewhere downstream the measurement module 501, but in-line with the pump 304, 404. The controller 536 is configured to control the pump 304, 404 to pump water out of the tank 302, 402, through the ammonia filter 560, and back into the tank 302, 402 in response to determining that the ammonia content of the water exceeds a predetermined ammonia content threshold. Thus, the at least one sensor sensing a property of water in the tank 302, 402 can be the ammonia sensor 526, and the property of the water in the tank 302, 402 based upon which the controller 536 controls the pump 304, 404 is an ammonia content of the water in the tank 302, 402 as determined by the ammonia sensor 526.

Figure 6:
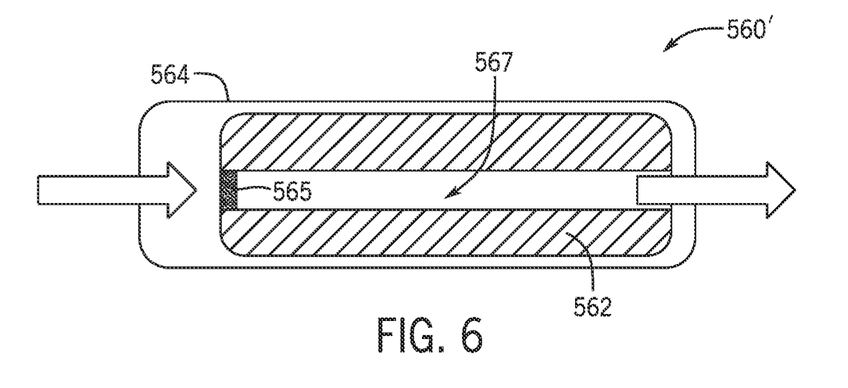
FIG. 6 illustrates one example of an ammonia filter cartridge according to the present disclosure.
Figure 7:
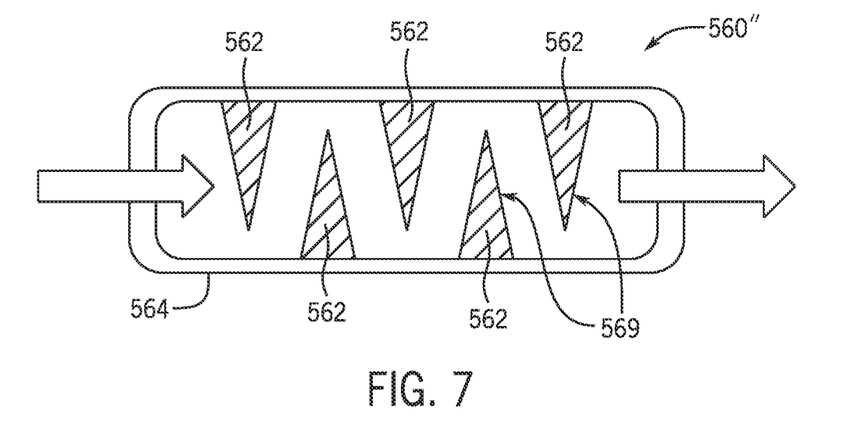
FIG. 7 illustrates another example of an ammonia filter cartridge according to the present disclosure.

The ammonia filter 560 can be a simple pad or can be a cartridge-type filter. Two examples of cartridge-type ammonia filters are shown in FIGS. 6 and 7. FIG. 6 shows an example in which the ammonia filter 560' is an outside-in filter having pleated filter media 562. Water flows into one end of the cartridge 564, inwardly through the filter media 562, and out of the cartridge 564 from the hollow center area 567 surrounded by the filter media 562. (Water is blocked from flowing directly through the hollow center area 567 by a cap 565.) In the example of FIG. 7, the filter media 562 is arranged as a series of baffles 569 around which the water must travel from one end of the cartridge 564 to the other. The baffles 569 create increased surface area that the water must contact as it travels through the cartridge 564, thereby increasing ammonia filtration. The filter media 562 in either ammonia filter 560', 560" can be a biological filter media, such as a fibrous mat on which nitrifying bacteria that convert ammonia to nitrites, then nitrates, can thrive. Alternatively, the filter media can be a porous bag filled with beads or chips of zeolite, which example is suitable more for the ammonia filter 560". When the fibrous mat is clogged, or when the useful life of the zeolite chips ends, the cartridge 564 can be removed from the outlet 554 of the measurement module 501 and replaced with a new cartridge. The controller 536 can determine that the fibrous mat is clogged if the pressure downstream of the ammonia filter 560', 560", as determined by a pressure sensor (not shown) located in the outlet 554 of the measurement module 501 or elsewhere downstream thereof, is above a predetermined threshold pressure. Alternatively, the controller 536 can determine that the fibrous mat is clogged if the electrical current drawn by the pump 304, 404, as determined by a current sensor associated therewith, is above a threshold current (indicating the pump is working harder than usual). The controller 536 can determine that the useful life of the zeolite has ended based on a predetermined period of time since the filter cartridge 564 was last replaced, or based on a reading from the ammonia sensor 526 being above a predetermined threshold.

In other examples, the ammonia filter 560 is not located in the measurement module 501, but is instead located downstream of the measurement module 501 and upstream or downstream of the pump 304, 404. In some examples, whether the ammonia filter cartridge 564 is installed in the measurement module 501 or elsewhere, an electrically controlled valve can be provided that diverts water through or bypasses the ammonia filter 560 based on the ammonia level as determined by the ammonia sensor 526. This way, the ammonia filter 560 could be used only when necessary. In either case, by placing the ammonia filter 560 in-line with the pump 304, 404, this increases contact time between the water and the biofilter, providing continuous removal to prevent a buildup of ammonia.

Figure 8:
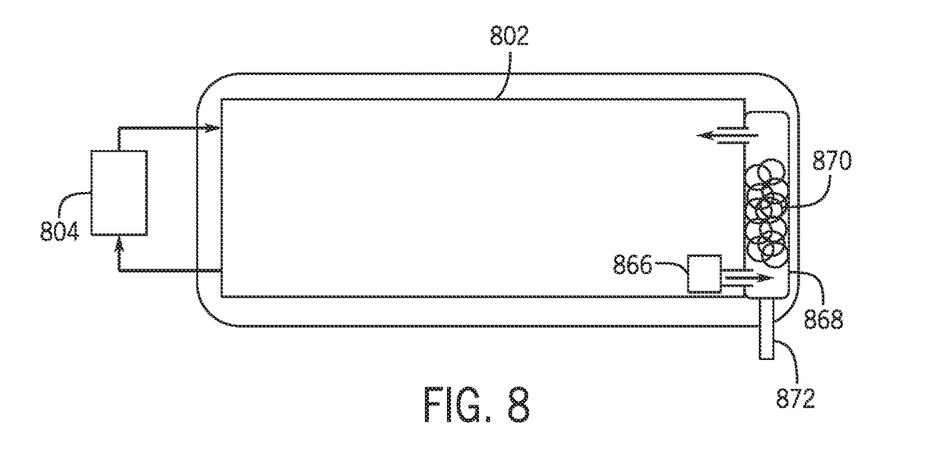
FIG. 8 illustrates a system with ammonia removal via mechanical and gravitational filtering.
Figure 9:
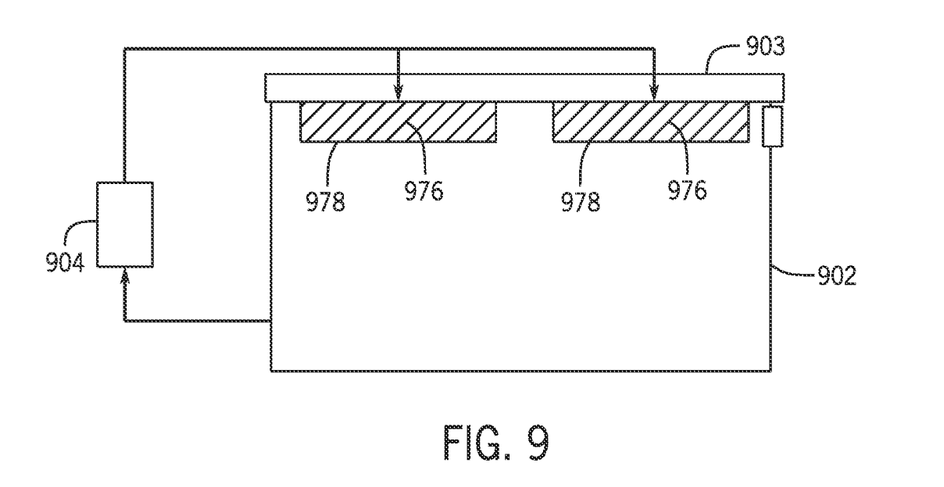
FIG. 9 illustrates a system with ammonia removal via biological filtering.

Other arrangements for filtering ammonia could be provided, as shown in FIGS. 8 and 9. In FIG. 8, mechanical and gravitation filtration is used to control ammonia levels in the tank 802. A pump 866 draw water into a compartment 868 that is situated alongside the tank 802. The compartment 868 is filled with filter media 870, such as pebbles, pieces of fibrous mat, or other known mechanical filtration media. Water circulates upward through the compartment 868 under pressure, as shown by the arrows, while debris is prevented from doing so by the filter media 870. Any debris that cannot move upwardly falls due to gravity to the bottom of the compartment 868, where heavier solids can then fall through a chute 872 for later removal. The controller 536 can be configured to run the pump 866 in response to the ammonia sensor 526 sensing ammonia above a predetermined threshold, and can turn the pump 866 off once the ammonia content drops to an acceptable level. In FIG. 9, the recirculation pump 904 pumps water back into the tank 902 through the lid 974. One or more biological filters 976 are located in a structure, such as a housing 978, suspended from the lid 903, and the water is directed to drip back into the tank 902 through these housings 978 and thus the filters 976. The bottom of each housing 978 is provided with holes to allow the water to drip out. Each housing 978 has an overflow hole at its top to allow water to escape if the filter 976 is clogged or if there is high flow from the pump 904. The system may also include an arrangement (such as valves and additional conduits) that allows water to be pumped directly back into the tank 902 without passing through the housings 978, and the controller 536 can be configured to pump the water through the housings 978 and filters 976 only when ammonia levels are above the threshold. Alternatively, the system can be configured such that water from the pump 904 always enters the tank 902 via the filters 976.

As described in the above examples, the controller 536 is configured to automatically take steps in response to a reading that DO is not within a given range, ammonia is too high, or temperature is not within a given range. The controller 536 can also report this information to the user's portable electronic device 556 via the transceiver 550. For example, if the controller 536 was able to correct the livewell conditions to bring them back to desired conditions, the controller 536 can provide a report of what conditions required correction, when correction was required, and what correction was taken (e.g., run recirculation pump, fill tank with fresh water, run dedicated ammonia removal pump, etc.) This report could be generated on a regular basis, when requested by the user, or when the livewell system is turned off. If there is a condition the controller 536 was not able to correct, the controller 536 can alert the user in real time via the portable electronic device 556. For example, if a filter is clogged or a pump is not working, the controller 536 is configured to send a push notification to the user regarding same, with the intent of prompting user interaction to fix the problem.

Returning to FIG. 5, according to some examples, the livewell system 300, 400 further comprises a global positioning system receiver 580 in signal communication with the controller 536, such as via the I/O interface 548 (as shown) or the transceiver 550. The GPS receiver 580 can be one already provided on the marine vessel for other uses, or can be one dedicated to the livewell system. In one example, the GPS receiver 580 is instead provided as part of the measurement module 501. The controller 536 is configured to store a geographical position of the marine vessel on which the livewell system 300, 400 is installed in connection with information related to at least one of the following: aquatic life added to the tank 302, 402 at the geographical location, a dissolved oxygen content of water in which the marine vessel is operating at the geographical location, and a temperature of water in which the marine vessel is operating at the geographical location. In order to obtain the temperature and/or DO content of the water in which the marine vessel is operating, the measurement module 501 could be fluidically connected to a pump that pumps freshwater into the tank 302, 402. Alternatively, separate temperature and DO sensors that are immersed directly in the body of water could be communicatively connected to the controller 536 via the I/O interface 548. The controller 536 can send the above-noted information to the cloud (as discussed herein above) for use by other fisherpersons. Additionally or alternatively, the controller 536 can later use this information when the user returns to the same geographical location, such as to determine if fishing conditions are the same as the last time the geographical location was fished, in order to predict whether fishing conditions will be favorable again. For example, if DO levels were optimal for a particular species at a point in time in the past, as determined by the collective weight of fish caught at that geographical location and the measured DO level, but upon return to that same spot DO levels are much lower, the controller 536 can determine that fishing may not be as successful this time, and report this to the user via the portable electronic device 556. Further uses for connecting geographical location to a species and/or weight of a catch might be for entertainment reasons, as noted above, and the stats of the fish can be shared with fishing enthusiasts via the internet.

According to another example of the present disclosure, portions of the above-described system can be provided as a kit for a livewell system 300, 400 on a marine vessel, the kit comprising a scale 320, 420 or multiple scales configured to measure a weight of a tank 302, 402 of the livewell system and any contents of the tank 302, 402. The kit includes a measurement module 501 comprising a housing 322, 422 having an interior 532 in fluid communication with an interior of the tank 302, 402 and configured to receive water from the tank 302, 402; at least one sensor 524, 526, 528, 530 located at least partially within the interior 532 of the housing 322, 422 and configured to determine a property of the water in the tank 302, 402 that is received in the housing 322, 422; and a controller 536 in signal communication with the scale 320, 420 and the at least one sensor 524, 526, 528, 530. The kit may be installed by a boat manufacturer or by a user after-market. The measurement module 501 may be configured to be installed in-line with a water recirculation system of the livewell system 300, 400, such as in-line with the pump 304, 404. The measurement module 501 may instead be installed on the wall or lid of the tank 302, 402, in which case a communication hole or holes can be cut in the tank 302, 402 to allow water to flow into the measurement module 501 via the inlet 552 and out of the measurement module 501 via the outlet 554.

According to one example, the kit further comprises an ammonia filter 560', 560" in the housing 322, 422, although ammonia filtration may optionally be provided as in the systems of FIGS. 8 and 9.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A livewell system comprising:
 a tank configured to hold water and aquatic life;
 at least one scale configured to measure a weight of the tank and any contents of the tank;
 at least one sensor configured to determine a property of the water in the tank;
 a pump configured to pump water into the tank;
 a controller in signal communication with the at least one scale, the at least one sensor, and the pump; and
 an additional sensor configured to provide information to the controller related to a volume of water displaced upon addition of aquatic life to the tank;
 wherein the controller is configured to determine the volume of water displaced based on the information from the additional sensor;

wherein the controller is configured to determine a weight of the aquatic life added to the tank based on information from the at least one scale and the volume of water displaced; and wherein the controller is configured to control the pump based on information from the at least one scale and the at least one sensor.

2. The livewell system of claim 1, wherein the controller is configured to control the pump based on the weight of the aquatic life added to the tank.

3. The livewell system of claim 2, wherein the controller is configured to control the pump based on a species of the aquatic life added to the tank.

4. The livewell system of claim 1, further comprising an ammonia filter in-line with the pump;

wherein the at least one sensor comprises an ammonia sensor and the property of the water in the tank is an ammonia content of the water in the tank; and wherein the controller is configured to control the pump to pump water out of the tank, through the ammonia filter, and back into the tank in response to determining that the ammonia content of the water exceeds a predetermined ammonia content threshold.

5. The livewell system of claim 1, wherein the at least one sensor comprises a first sensor sensing a dissolved oxygen content of the water in the tank and a second sensor sensing a temperature of the water in the tank; and wherein the controller is configured to control the pump so as to maintain the dissolved oxygen content of the water within a predetermined dissolved oxygen content range and so as to maintain the temperature of the water within a predetermined temperature range.

6. The livewell system of claim 1, further comprising a housing in which the at least one sensor is located, wherein an interior of the housing is in fluid communication with an interior of the tank.

7. The livewell system of claim 1, further comprising a transmitter in signal communication with the controller, wherein the transmitter is configured to transmit information related to the property of the water in the tank from the controller to a portable electronic device.

8. The livewell system of claim 1, further comprising a global positioning system receiver in signal communication with the controller;

wherein the controller is configured to store a geographical location of a marine vessel on which the livewell system is installed in connection with information related to at least one of the following: aquatic life added to the tank at the geographical location, a dissolved oxygen content of water in which the marine vessel is operating at the geographical location, and a temperature of water in which the marine vessel is operating at the geographical location.

9. The livewell system of claim 1, wherein the at least one sensor is configured to sense a dissolved oxygen content of the water in the tank;

wherein the controller is configured to determine a required dissolved oxygen content based on the weight of the aquatic life added to the tank; and wherein the controller is configured to control the pump to aerate the water in the tank until the dissolved oxygen content of the water in the tank reaches the required dissolved oxygen content.

10. A kit for a livewell system, the kit comprising:
at least one scale configured to measure a weight of a tank of the livewell system and any contents of the tank;

a measurement module comprising:
at least one sensor configured to determine a property of water in the tank; and
a controller in signal communication with the at least one scale and the at least one sensor; and an additional sensor configured to provide information to the controller related to a volume of water displaced upon addition of aquatic life to the tank;

wherein the controller is configured to determine the volume of water displaced based on the information from the additional sensor;

wherein the controller is configured to determine a weight of the aquatic life added to the tank based on information from the at least one scale and the volume of water displaced; and wherein the controller is configured to control a pump that pumps water into the tank based on information from the at least one scale and the at least one sensor.

11. The kit of claim 10, wherein the controller is configured to control the pump based on the weight of the aquatic life added to the tank.

12. The kit of claim 11, wherein the controller is configured to control the pump based on a species of the aquatic life added to the tank.

13. The kit of claim 10, wherein the measurement module further comprises:
a housing having an interior in fluid communication with an interior of the tank and configured to receive water from the tank; and
an ammonia filter in the housing;
wherein the housing is configured to be installed in-line with the pump;
wherein the at least one sensor comprises an ammonia sensor located at least partially within the interior of the housing, and the property of the water in the tank is an ammonia content of the water in the tank; and
wherein the controller is configured to control the pump to pump water out of the tank, through the ammonia filter, and back into the tank in response to determining that the ammonia content of the water exceeds a predetermined ammonia content threshold.

14. The kit of claim 10, wherein the at least one sensor comprises a first sensor sensing a dissolved oxygen content of the water in the tank and a second sensor sensing a temperature of the water in the tank; and
wherein the controller is configured to control the pump so as to maintain the dissolved oxygen content of the water within a predetermined dissolved oxygen content range and so as to maintain the temperature of the water within a predetermined temperature range.

15. The kit of claim 10, wherein the measurement module further comprises a transmitter in signal communication with the controller; and
wherein the transmitter is configured to transmit information related to the property of the water in the tank from the controller to a portable electronic device.

16. The kit of claim 10, wherein the controller is configured for signal communication with a global positioning system receiver; and
wherein the controller is configured to store a geographical location of a marine vessel on which the kit is installed in connection with information related to at least one of the following: aquatic life added to the tank at the geographical location, a dissolved oxygen content of water in which the marine vessel is operating at the geographical location, and a temperature of water in which the marine vessel is operating at the geographical location.

17. The kit of claim 10, wherein the measurement module is configured to be installed in-line with a water recirculation system of the livewell system.

18. The livewell system of claim 10, wherein the at least one sensor is configured to sense a dissolved oxygen content of the water in the tank;
- wherein the controller is configured to determine a required dissolved oxygen content based on the weight of the aquatic life added to the tank; and
- wherein the controller is configured to control the pump to aerate the water in the tank until the dissolved oxygen content of the water in the tank reaches the required dissolved oxygen content.

19. A livewell system comprising:
- a tank configured to hold water and aquatic life;
- at least one scale configured to measure a weight of the tank and any contents of the tank;
- a pump configured to pump water into the tank;
- a controller in signal communication with the at least one scale and the pump; and
- a sensor configured to provide information to the controller related to a volume of water displaced upon addition of aquatic life to the tank;
- wherein the controller is configured to determine the volume of water displaced based on the information from the sensor;
- wherein the controller is configured to determine a weight of the aquatic life added to the tank based on information from the at least one scale and the volume of water displaced; and
- wherein the controller is configured to control the pump based on the weight of the aquatic life added to the tank.

20. The livewell system of claim 19, further comprising a dissolved oxygen sensor configured to sense a dissolved oxygen content of the water in the tank;
- wherein the dissolved oxygen sensor is in communication with the controller;
- wherein the controller is configured to determine a required dissolved oxygen content based on the weight of the aquatic life added to the tank; and
- wherein the controller is configured to control the pump to aerate the water in the tank until the dissolved oxygen content of the water in the tank reaches the required dissolved oxygen content.

* * * * *